(12) United States Patent
Kazuno et al.

(10) Patent No.: US 6,457,777 B1
(45) Date of Patent: Oct. 1, 2002

(54) SEAT CUSHION PAD (75) Inventors: Atsushi Kazuno; Masanobu Banno; Takanori Sugie; Katsuya Sato; Kikuo Sekita, all of Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/652,258

(22) Filed: Aug. 30, 2000

(30) Foreign Application Priority Data

| Sep. 3, 1999 | (JP) | 11-250078 |
| Jun. 19, 2000 | (JP) | 2000-182802 |
| Jun. 19, 2000 | (JP) | 2000-182824 |

(51) Int. Cl.[7] ................................. A47C 7/02
(52) U.S. Cl. ..................... 297/452.48; 297/DIG. 1
(58) Field of Search ............... 297/DIG. 1, 452.48, 297/DIG. 2

(56) References Cited

U.S. PATENT DOCUMENTS

| 3,876,569 A | 4/1975 | Priest et al. |
| 4,167,612 A | 9/1979 | Tucker et al. |
| 5,306,738 A | 4/1994 | Yoshimura et al. |
| 5,710,192 A | 1/1998 | Hernandez |

FOREIGN PATENT DOCUMENTS

| EP | 547764 | 6/1993 |
| EP | 704468 | 4/1996 |
| GB | 2006618 | 5/1979 |
| JP | 3-140319 | 6/1991 |

Primary Examiner—Milton Nelson, Jr.

(57) ABSTRACT

A seat cushion pad composed of polyurethane foam having a skin layer and a core layer, the polyurethane foam is molded by pouring a polyurethane foam raw material composition into a mould, the seating portion of the seat cushion pad has a one layer structure, wherein the air permeability is 0.05–1.5 cfm (cubic feet/min, i.e., ft3/min) [1.41 to 42.2 L/min], and the hysteresis loss of the core layer is 17% or below.

8 Claims, 3 Drawing Sheets

(A)

(B)

ILD measuring point

ILD measuring point (B)

ILD measuring point (C)

SEAT CUSHION PAD

BACKGROUND OF THE INVENTION

1. Field of the Invention

The present invention relates to a seat cushion pad composed of polyurethane foam, especially a seat cushion pad for use of a vehicle, especially a car, where a vibration is accompanied with the use of the seat.

2. Description of the Related Art

With respect to the comfortability of a car seat cushion, JASO B-407 regulates a standard on the vibration transmissibility characteristics. For attainment of comfortable feeling, it is effective, in general, to remarkably damp the vibration in a frequency region that makes persons feel uncomfortable. The frequency of vibration that makes persons feel uncomfortable is in the region of 4–10 Hz, and the vibration transmissibility at 6 Hz is conventionally employed for estimating the degree of the uncomfortable feeling described the regulation in the JASO. It is said that the vibration at the frequency about 6 Hz tends to cause carsickness, especially. Therefore, also in the development of the car seat cushion pad composed of polyurethane, much effort are devoted to suppress the vibration transmissibility in such frequency region.

Japanese patent publication H03-140319(A1) discloses a polyurethane foam which have a lower resonance frequency than usual, so as to remove the uncomfortable feeling of seat cushion.

The seat cushion pad according to the above prior art, which has suppressed vibration transmissibility characteristics at 6 Hz, shows large resonance amplitude (resonance peak) at the frequency region of 2 to 4 Hz. Therefore, when person sitting on a seat cushion using such polyurethane foam disclosed in the prior arts, often feels an instability of the body according to the vibration while travelling. Namely, such polyurethane foam can not protect sufficiently the disagreeable feeling that person's body bounds up and down at a low frequency (feeling by shaking).

SUMMARY OF THE INVENTION

Accordingly, for the seat cushion pad for vehicle, a car for example, such characteristics listed below are required to prevent carsickness and fatigue of drivers and passengers.

i) suppressed vibration transmissibility characteristics at a frequency region about 6 Hz ii) stability of the body of the person, who is sitting on the seat cushion and is driving the car iii) a lower vibration transmissibility characteristics at a wider frequency region However, according to a theory of a vibration engineering, in general, when the resonance amplitude in a vibration transmissibility characteristics at a frequency region of 2 to 4 Hz is lowered, the vibration transmissibility at a higher frequency (for example, 6 Hz), which is related to the agreeability of the seat cushion, increases. And the vibration transmissibility characteristics (vertical axis: vibration transmissibility; horizontal axis: frequency) shows broad curve as a whole. Namely, the lowering of the vibration transmissibility and the lowering of the resonance amplitude in a vibration transmissibility characteristics curve are contradictory requirements to each other.

Thus, the object of the present invention is to provide a seat cushion pad which shows lower resonance amplitude at 2–4 Hz and simultaneously shows the same or lower vibration transmissibility at a frequency region of about 6 Hz, compared to a conventional seat cushion pad. Thus, a seat cushion pad of the present invention shows a high damping characteristics.

The inventors of the present invention have studied eagerly the vibration transmissibility characteristics of a seat cushion pad made from urethane foam, and found that the aforementioned object can be achieved, when the hysteresis loss of a core layer of a urethane foam is less than 17% and the air permeability of the urethane foam including the skin portion falls in a special region. And the invention is accomplished.

A seat cushion pad according to the present invention is composed of polyurethane foam having a skin layer and a core layer, which is molded by supplying polyurethane foam raw material composition into a mould, characterized in that the seat surface has a single-layer structure, that the air permeability is between 0.05 and 1.5 cfm (cubic feet/min, i.e., ft3/min), and that the hysteresis loss of the core portion is 17% or below.

It is preferable that the air permeability of the seat cushion pad according to the present invention is between 0.1 and 1.5 cfm (2.81 to 42.2 L/min) and that the hysteresis loss is 15% or below. The air permeability shall be measured according to the regulation of ASTM D-1564 (DOW method).

The hysteresis loss of the core portion shall be measured using the sample which belongs evidently to the core layer, though the skin layer and the core layer is continuously formed and there is not any sharp boundary between them.

The seat cushion pad according to the present invention has a less resonance amplitude in the vibration transmissibility characteristics curve than that of a conventional seat cushion pad, and its vibration transmissibility at about 6 Hz is equal or less than a conventional seat cushion pad, as will be shown by evaluation results of the examples described later. Namely, according to the present invention, irrespective of the shape, it is possible to manufacturing a seat cushion pad, having a lower resonance amplitude and a lower vibration transmissibility at frequency of 6 Hz than conventional seat cushion pad.

The inventors of the present invention obtained new knowledge that the resonance amplitude in the vibration transmissibility characteristics is influenced by the air permeability: the lower the air permeability is, the lower the resonance amplitude is. And it is deduced that it is effective to lower the air permeability range, in such a manner as defined in the present invention, for lowering the resonance amplitude. Thus the range of the air permeability of the seat cushion pad according to the present invention is between 0.05 and 1.5 cfm (1.41 to 42.2 L/min). The lower limit of the air permeability range is defined with respect to the stability in the seat cushion pad forming. Namely, from a viewpoint of the stability of foaming, it is preferable that the air permeability is over 0.1 cfm, and particulary it is preferable that it is over 0.3 cfm (8.43 L/min). For lowering the resonance amplitude at 2 to 4 Hz, it is preferable that the air permeability is less than 1.5 cfm (42.2 L/min).

The measured value of the air permeability of polyurethane foam does not include the effect of the covering material of the seat cushion such as cloth, which will be applied to the seat cushion pad for producing the seat, the final product. However, the measured value of the air permeability includes the effect of the skin layer.

On the other hand, the hysteresis loss of the core layer, one of the physical properties defining the present invention, has almost no relation with the air permeability, and depends on the kind of the polymer which constitute the polyurethane foam. Further, the inventors obtained a new knowledge that the resonance frequency of a seat cushion pad composed of polyurethane foam depends on the hysteresis loss of the core layer, more precisely, the former is proportional to the later, and that the resonance frequency is inversely proportional to the resonance amplitude. Thus, it is deduced that an utilization of material having small hysteresis loss of core layer is effective in lowering the resonance frequency, in order to realize a seat cushion pad having a lower resonance amplitude and a lower vibration transmissibility at 6 Hz. It is preferable that the hysteresis loss of the core layer is 17% or below. And it is more preferable that the loss is 15% or below. The less the hysteresis loss of core layer is, the more preferable it is.

As explained above, for the first time, the object of the present invention is attained, by a seat cushion pad composed of polyurethane foam defined by the present invention, in which, on one hand, the air permeability as a whole of the foam including the skin layer, which is a physical properties to lower the resonance amplitude at a frequency of 2 to 4 Hz, is designed to fall in a predetermined range, and on the other hand, the hysteresis loss of the core layer, which is a physical properties to lower the vibration transmissibility in a frequency region of about 6 Hz and has no correlation with the air permeability, is designed to fall in a predetermined range. It is preferable to apply the seat cushion pad according to the present invention in making a pad having a thickness of 60–140 mm at its seating portion.

According to the present invention, it is preferable that the density of the polyurethane foam of the core portion is 50–65 kg/m$^3$. In such a case, a seat cushion pad, having a air permeability between 0.05 and 1.5 cfm, a hysteresis loss of the core layer 17% or below and a as a compression modulus conforming to the requirements for a seat cushion pad for use of a car, can be securely obtained. And such density of the core portion is effective for lowering of the resonance amplitude in 2 to 4 Hz and the vibration transmissibility at about 6 Hz.

It is preferable that the aforementioned seat cushion pad is composed of polyurethane foam raw material composition, which comprises at least, a) 30 to 80 parts by weight of polyether polyol having hydroxyl value of 20 to 40 mgKOH/g and having ethylene oxide unit at its terminal, b) 70 to 20 parts by weight of polymer polyol having hydroxyl value of 15 to 30 mgKOH/g (total parts by weight of the polyol (a+b) components is 100), c) 0.1 to 2 parts by weight of silicone surfactant, d) blowing agent, and e) polyisocyanate compounds.

When the seat cushion pad is made from such raw materials having the aforementioned constitution, the freedom of the adjustment of the hysteresis loss is higher, hence, a seat cushion pad having a air permeability of 0.05–1.5 cfm and a hysteresis loss of 17% or below can securely obtained.

It is more preferable that the hydroxyl value of the polyether polyol(a), which has an ethylene oxide unit at its terminal and hence primary OH, is in the range of 24 to 36 mgKOH/g. In such a case, the air permeability and the hysteresis loss can be adjusted in a predetermined range, and also other advantageous characteristics as a seat cushion pad can be obtained.

The seat cushion pad, according to the present invention, can be characterized in the following points: the seat cushion pad is composed of polyurethane foam having a skin layer and core layer and having a one layer structure at its seating surface, and the polyurethane foam is molded by supplying (pouring or injection) the polyurethane foam raw material composition into a mould; the polyurethane foam material comprises:

a) 30 to 80 parts by weight of polyether polyol having hydroxyl value of 20 to 40 mgKOH/g and ethylene oxide unit at its terminal, b) 70 to 20 parts by weight of polymer polyol having hydroxyl value of 15 to 30 mgKOH/g (total parts by weight of the polyol components is 100), c) blowing agent, d) 0.1 to 2 parts by weight of silicone surfactant, and e) polyisocyanate compounds;

wherein the silicone surfactant is selected so that the free foaming height of the free blow foam will be 225 mm or more.

According to the present invention, a seat cushion pad can be obtained, which has a low resonance amplitude in a vibration transmissibility characteristics curve, as well as a low vibration transmissibility at about 6 Hz, which is equivalent or less comparing to the level of a conventional seat cushion pad. Namely, irrespective of the shape of the seat cushion pad, it is possible to obtain a seat cushion pad having resonance amplitude as well as vibration transmissibility, either of which is lower than that of the conventional seat cushion pad.

The free foaming height of the free blow foam is an index representing the characteristics of a surfactant. Table 1 shows a model composition of the polyurethane foam material. The free foaming height of free blow polyurethane foam is measured by foaming the model composition material shown in the Table 1. The free foaming height of polyurethane foam is an index for estimating the characteristics of a surfactant, using the model polyurethane raw material composition.

TABLE 1

| Constituent | Dosage |
| --- | --- |
| Polyether EP-901 (MITSUI CHEMICAL Co.) | 70 parts by weight |
| Polymer Polyol POP3690 MITSUI CHEMICAL) | 30 parts by weight |
| Diethanolamine (crosslinking agent) | 2.0 parts by weight |
| Water (blowing agent) | 3.0 parts by weight |
| Dabco 33LV (catalyst) | 0.5 parts by weight |
| Toyocat ET (catalyst) | 0.1 parts by weight |
| Silicone surfactant | 1.0 parts by weight |
| Isocyanate TM-20 (MITSUI CHEMICAL Co.) | NCOindex = 1.0 |

The free foaming height of foam is obtained by measuring the height of free blow foam formed in a vessel having frustum cone shape, having a bottom diameter of 105 mm, a top diameter of 140 mm and a height of 195 mm. The total weight of the raw material composition of the foam is adjusted to be 147.3±0.5 g.

In measuring the free foaming height, each of the polyol components including the polyols in the upper part of Table 1 are mixed homogeneously, then the temperature of both of the polyol components and the isocyanate compounds are adjusted to be 25° C., and they are mixed homogeneously with each other, so as to form a foam under a predetermined condition (at room temperature). The mixing is carried out using a common mixer, which can mix the polyol compounds and the isocyanate compound to be homogeneous within about 5 seconds.

When the free foaming height is less than 225 mm, it is impossible to obtain a seat cushion pad having low resonance amplitude and low vibration transmissibility at 6 Hz, either of which is lower than those of common seat cushion pad. Also when the constituent of the polyurethane material are out of the range defined hereinbefore, it is impossible to obtain a seat cushion pad having a desired characteristics. The surfactant comprised of two or more compounds can be used, if the free foaming height evaluated using the mixture is over 225 mm.

It is preferable that the seat cushion pad has air permeability of 0.05–1.5 cfm (cubic feet/meter, i.e., ft3/min) (1.41 to 42.2 L/min), and that its hysteresis loss of the core layer is 17% or below.

It is more preferable that the seat cushion pad has air permeability of 0.1 to 1.5 cfm (2.81 to 42.2 L/min), and its hysteresis loss of the core layer is 15% or below.

When the air permeability and the hysteresis loss are adjusted to be within the aforementioned range, a seat cushion pad can be securely obtained, which has lower resonance amplitude in the vibration transmissibility characteristics curve and equal or lower vibration transmissibility at about 6 Hz than that of the conventional seat cushion pad.

It is preferable that the polyurethane foam raw material composition, for producing the seat cushion pad according to the present invention, further includes a low molecular weight crosslinking agent having hydroxyl value of 300 to 2000 mgKOH/g. It is more preferable that the hydroxyl value of the crosslinking agent is within the range of 400 to 1800 mgKOH/g. When the crosslinking agent is comprised of a plurality of compounds, the hydroxyl value is the mean value.

When such a low molecular weight crosslinking agent is used, the adjustment of the air permeability, the hysteresis loss of the core layer, and the compression modulus of a seat cushion pad can be facilitated. It is preferable that the amount of the crosslinking agent is 0.2 to 10 parts by weight, more preferably 0.5 to 6, to the 100 total parts by weight of the polyether polyol and the polymer polyol(polyol component).

It is preferable, according to the present invention, that the aforementioned silicone surfactant is polydimethylsiloxane or a compound represented by the chemical formula 1, where x is number of repeating units of the dimethylsiloxane, y is number of repeating units of the copolymer polyether substituted dimethylsiloxane, and the equivalent weight ratio x/y is $0.75/0.25 \leq x/y < 1.00$; and m,n is number of ethylene oxide unit and propylene oxide unit in the copolyether, respectively, and the equivalent ratio m/n is between 0.4/0.6 and 0.05/0.95. In the case of using another surfactant together, it is preferable that the aforementioned surfactant is contained over than 10 wt % of the total surfactant.

[Chemical Formula 1]

In the chemical formula 1, X denotes organic residual group of carbon number 1 to 4. R denotes alkyl or acyl group.

The equivalent ratio x/y and m/n in the chemical formula 1 can be measured by NMR. In the measurement of these values, for example, the value of x/y can be obtained from the integrated peak strength of the H in Si—$CH_3$ and the integrated peak strength of the H in the methylene group in the Si—$CH_2$—, and the value of m/n can be obtained from the integrated peak strength of the H in the methylene group in the ethylene oxide unit and the integrated peak strength of the peak of the H of in the methyl group in the propylene oxide unit.

It is preferable that the aforementioned polyisocyanate compounds is a mixed diisocyanate, which is a mixture of toluene-diisocyanate (TDI) and diphenylmethane-diisocyanate (MDI), the equivalent weight ratio of them is in the region of 70/30 to 90/10.

When such polyurethane raw material is used, it is possible to produce securely a seat cushion pad, having the air permeability is in the region of 0.05 to 1.5 cfm and the hysteresis loss of the core layer is less than 17%.

DETAILED DESCRIPTION OF THE PREFERRED EMBODIMENT

The polyurethane foam, which constitutes the seat cushion pad according to the present invention, is a kind of flexible polyurethane foam, and can be fabricated from urethane foam raw material composition containing at least polyol compounds, polyisocyanate compounds, blowing agent, catalyst and surfactant.

The value of the hysteresis loss of the core layer of a seat cushion pad depends strongly on the polymer material. Thus, the hysteresis loss of the core layer of a seat cushion pad can be adjusted, by selecting a suitable polyurethane raw material. The constitutional proportion of the polyol in polyurethane is large. Thus, the hysteresis loss of core layer of a seat cushion can be adjusted by selecting a kind(type) and/or molecular weight of the polyol component.

On the other hand, the air permeability of the seat cushion pad depends strongly on the cell structure of the foam. Therefore, when a suitable surfactant is selected and used so that the free foaming height of the foam is larger than 225 mm, where the height is measured according to a predetermined estimating method, it is possible to obtain polyurethane foam pad, which has a low resonance amplitude at 2 to 4 Hz and a low vibration transmissibility at about 6 Hz, simultaneously.

With respect to the polyol component for use of the flexible polyurethane foam, according to the present invention, there is no limitation about the kind, etc, but the hysteresis loss of the seat cushion pad shall be in the aforementioned value region. However, it is preferable to employ polyoxyalkylene glycol, which facilitates the adjustment of the hysteresis loss so as to fall in the aforementioned value region.

As a polyoxyalkylene glycol, ordinary polyetherpolyol is used, which is obtained by adding alkylene oxide to poly functional alcoholic compounds as an initiator.

The examples of the poly-functional alcoholic compounds are: ethylene glycol, propylene glycol, glycerin, trimethylolpropane, pentaerythritol, sorbitol, sucrose, triethanolamime, dimethanolamine.

Examples of the alkylene oxide for the addition polymerization of the poly-functional alcoholic compounds are alkylene oxide, having carbon number 2, such as ethylene oxide, 1,2-propylene oxide, 1,2-butylene oxide, 2,3-butylene oxide, and styrene oxide. Among these compounds, the mixture of propylene oxide and/or butylene oxides and ethylene oxide is preferable, because the cost is cheap and the characteristics of the obtained seat cushion pad is good. Particularly, it is more preferable to use a polyol that contains 3 to 50 wt %, more preferably, 3 to 25 wt % of ethylene oxide unit.

With respect to the polyoxyalkylene glycol, both of the random copolymer or block copolymer of the aforementioned alkylene oxide can be used. However, a polyoxyalkylene glycol containing ethylene oxide unit at its terminal(—$(CH_2CH_2O)_n$H) is preferable, from the viewpoint of excellent reactivity with isocyanate group. With respect to the content of primary OH (the proportion of the terminal ethylene oxide unit), it is preferable to contain ethylene oxide unit over 3, more preferably over 5, especially preferably 10 to 20, wt % of the oxyalkylene unit of the polyoxyalkylene glycol.

Ordinarily, it is preferable that the molecular weight per crosslink, in other word, molecular weight per 1 hydroxyl group, of such polyoxyalkylene polyol is 1000 to 4000 from the viewpoint of adjustment of the hysteresis loss. Especially, the molecular weight per crosslink of 1500 to 2800 is more preferable, from the viewpoint of the adjustment of the hysteresis loss.

According to the present invention, a polymer polyol is used, in which a polymer fine particles are dispersed in a polyol compound.

Examples of the polymer particle are: particles of addition polymerization polymers such as homopolymers or copolymers of vinyl monomers, for example, acrylonitrile, styrene, alkylmethacrylate, and alkylacrylate; or particles of synthetic resin of polycondensation polymers, for example, polyester, polyurea, and melamine. Particularly, homopolymers or copolymers of acrylonitrile and polyurea are preferable. Especially, homopolymer of the acrylonitrile is most preferable. From the viewpoint of the molding of the seat cushion pad, materials containing particles of acrylonitrile is most preferable.

When the concentration of the polymer particles in the polyol as a whole is too much, it becomes expensive. Thus, it is preferable that the concentration is lower than 40 wt %, more preferably, less than 20 wt % On the other hand, from viewpoint of the hardness and durability of the seat cushion pad, it is preferable that the concentration of the polymer particles in the total polyol component is over 1 wt %, preferably over 2 wt %.

There is no limitation how the polymer particles shall be introduced into the polyol component. For example, when the polymer particles are addition polymerization polymers, a stable dispersion of the particles can be obtained by polymerizing the monomers of styrene or acrylonitrile in the polyol, such as polyoxyalkylene polyol, etc., under the existence of a radical polymerization initiator. The polymer polyols (POP) are available from MITSUI CHEMICAL Co. or ASAHI GLASS Co.

It is preferable that the concentration of the unsaturated group at the terminal of both of the aforementioned polyetherpolyol (a)and the polyoxyalkylenepolyol constituting polymerpolyol is low. Specifically, it is preferable that the concentration of the unsaturated group at the terminal is less than 0.1 meq/g. When the concentration of the unsaturated group is high, the compression set of the polyurethane foam tends to be large, and the problems on the durability etc, may appear.

A variety of polyisocyanate compounds, which have two or more isocyanate groups and are conventionally used in fabricating the seat cushion pad, such as aromatic compounds, alicyclic compounds and aliphatic compounds, as well as modified polyisocyanate compounds of these polyisocyanate compounds can be used. Further the polyisocyanate compounds can by a mixture of two or more these poly-isocyanate compounds.

Examples of the polyisocyanate compounds are: aromatic compounds, such as, toluene diisocyanate (TDI), diphenylmethanediisocyanate (MDI)(purified diphenylmethanediisocyanate (p-MDI), crude MDI (c-MDI)), or alicyclic and aliphatic compounds, such as, xylylenediisocyanate, isophoronediisocyanate, hexamethylenediisocyanate. Examples of the modified compounds of these materials are: prepolymer derivatives of polyisocyanate compounds, isocyanurate type compounds, urea type compounds and carbodiimide type compounds. Among these materials, toluene diisocyanate, diphenylmethanediisocyanate, crude MDI are preferable, because their reactivity is high, the characteristics of the seat cushion pad is good, and the cost is cheap, etc. There are two types of toluene diisocyanate, 2,4-TDI and 2,6-TDI. It is preferable to use the mixture of these substitutions. It is more preferable to use the mixture, the proportion of the 2,4-TDI and the 2,6-TDI is in the range of 90/10 to 60/40. It is more preferable to use TDI mixed with crude MDI, the weight proportion is TDI:MDI= 70:30–90:10, particularly preferably 80:20, because a foam, which has a low hysteresis loss of core layer, lower than 17%, can be securely obtained, and foaming efficiency and the reaction curing characteristics are excellent, so that the productivity increases.

With respect to the blowing agent, water, halogenated hydrocarbon, such as, HCFC-141b, HFC-134a, HFC-245fa, HFC-365mfc, low boiling point alicyclic or aliphatic hydrocarbon, such as cyclopentane and n-pentane, or liquid carbon dioxide gas can be used. Among them, the simultaneous use of the water and the liquid carbon dioxide gas is preferable. It is especially preferable to use the water as a single blowing agent.

Examples of the catalyst for forming polyurethane foam are: amine catalysts, such as, tri-ethylenediamine (TEDA), bis(N,N-dimethylamino-2-ethyl)ether, N,N,N',N'-tetramethylhexamethylenediamine, bis(2-dimethylaminoethyl) ether (TOYOCAT-ET; available from TOSO Co.), metal salts of carboxylic acid, such as, potassium acetate and potassium octylate, and organic metal salts, such as, dibuthylditindilaurate. Among them, the amine catalysts are preferable, which are suitable for molding the polyurethane foam, using water as a blowing agent.

In the manufacuring of a seat cushion pad according to the present invention, using of low molecular weight polyfunctional reactive hydrogen containing compounds as a crosslinking agent is one of the preferable embodiments. By using such a crosslinking agent, the adjustment of the hysteresis loss, air permeability, hardness of the seat cushion pad is easy. Examples of such low molecular weight crosslinking agents are: polyfunctional alcohols, such as, ethylene glycol, propylene glycol, 1,4-butane diol, trimethylolpropane, glycerol; compounds having hydroxyl value in a region of 300 to 1000 mgKOH/g obtained by ring-opening addition reaction of ethylene oxide or propylene oxide to one or more of these polyfunctional alcohols; and alkanolamines, such as, monoethanoramine, diethanoramine, triethanoramine, N-methyldiethanolamine. These compounds can be used alone or be used as a mixture of two or more these compounds. Also commercially available products containing these compounds can be used and give a preferable result. Examples of such products are KL-210 (MITSUI CHEMICAL Co.), HARDMASTER-17 (DAI-ICH KOGYOU SEIYAKU Co.) and EL-980 (ASAHI GLASS Co.).

The ordinal dosage of each of the polyol component, polyisocyanate compound, blowing agents, catalysts, surfactants used in the polyurethane foam raw material composition are shown below. However, of course, the dosage of these compounds can be changed, according to the necessity, for adjusting the air permeability of the seat cushion pad.

The equivalent ratio of the hydroxyl group of the polyol composition to that of the isocyanate group, isocyanate index (NCO/OH equivalent ratio ,NCO index), shall fall in the region of 0.85 to 1.15, (i.e., NCO index is 85 to 115). The equivalent of the hydroxyl group of the polyol composition is calculated including the water, when the blowing agent is water. Preferable isocyanate index is within the region of 0.95 to 1.05(95–105), and more preferably it is 1.0. The isocyanate index can be adjusted in a conventionally used range, for setting the hardness of the seat cushion pad (25% ILD) to an aimed value. When the blowing agent is water, ordinarily, the quantity of the water is 0.1 to 8 parts by weight, preferably 2 to 4 parts by weight, to 100 parts by weight of polyol component. The quantity of the catalyst is ordinarily, less than 10 parts by weight, preferably 0.05 to 1.0 parts by weight, to 100 parts by weight of polyol component. The quantity of the surfactant is ordinarily, 0.01 to 5 parts by weight, preferably 0.1 to 2 parts by weight, (when the surfactant is diluted by such as plasticizer, the proportion is calculated based on the effective component).

Further, other additives can be added into the polyurethane foam raw material, when they are necessary. Examples of such additives are emulsifiers, fillers, antioxidants, flame retardants, ultraviolet absorbents, anti-aging agent, colorant, anti-mycotic agents, and anti-blastic agents.

A seat cushion pad is molded using the polyurethane foam raw material composition including the aforementioned materials in a mould, which has a cavity suitable for the application of the seat cushion pad. The molding process can be a conventional one. For example, the necessary quantity of the polyol components(polyol(a) and polymer polyol(b)), blowing agents, catalysts, surfactants, and other compounds, such as, crosslinking agent, when it is necessary, are weighted and premixed to obtain polyol composition. Then polyisocyanate compounds are mixed with this polyol composition rapidly by a polyurethane foaming machine or a mixing machine to obtain polyurethane foaming composition. And the polyurethane foaming composition is supplied into a mould by pouring, injection, and so on. After a predetermined time, flexible polyurethane foam as a seat cushion pad is released from the mould.

The adjustment of the air permeability of the seat cushion pad can be carried out at the step of seat cushion pad molding and/or after the molding.

Examples of the method of the adjustment of the air permeability in the seat cushion pad molding step are: an use of silicone surfactant, which has a high activity; an increase of the proportion of an amine catalyst, which activates the polyurethane polymerization reaction; or an increase of the proportion of polyoxyalkylene glycol of high primary OH content (high proportion of the of terminal ethylene oxide unit) in the polyol component; or a combination of these methods.

The adjustment of the free foaming height and the air permeability by using the surfactant is performed by controlling the cell size of the polyurethane foam. When the cell size(diameter) is decreased, the free foaming height of foam increases and the air permeability decreases.

Examples of the silicone surfactant having high activity are: any of conventional surfactants, such as, polydimethylsiloxane and its derivatives. It is preferable to use commercially available silicone surfactants having high activity. Examples of preferable commercially available surfactants are: SF2965, SF2962, SF2961 (TORAY-DOW-CORNING-SILICONE Co.), L-5366, L-5309 (NIHON UNICAR Co.), B8680 (GOLDSCHMIDT Co.). Among them, SF2965, SF2962, L-5366, L-5309 are polydimethylsiloxane or a compound expressed by the aforementioned chemical formula 1, and their x/y ratio and m/n ratio are in a preferable region. Especially, it is preferable to use a surfactant which has a capability to lower the surface tension by 1 (dyne/cm) after the addition of the surfactant into the polyol compared to that of before the addition of the surfactant. The surface tension and the surface tension lowering capability can be adjusted not only by using a single surfactant, but also by using a plurality of surfactants. When other surfactants are used simultaneously, the proportion of the surfactants selected from the group of SF2965, SF2962, B8680, L-5366 and L-5309 shall be at least 10 wt % of the total surfactants.

The air permeability can be adjusted, by increasing the polymerization rate, without using the surfactant of high activity. Examples of the preferable method to increase the polyurethane polymerization rate are: an use of a compounds as a polyol component, having a high proportion of the terminal ethylene oxide unit; an use of catalyst having a high activity; and an use of a isocyanate compounds having high reactivity. In this case of using catalysts, it is preferable to use conventional amount of an amine catalyst and/or metal catalyst, having high polyurethane polymerization activity.

The air permeability of the seat cushion pad varies with the thickness of the skin layer, which is a surface layer of the polyurethane foam and is formed at the polyurethane foam molding process. The thickness or the characteristics of the skin layer varies with the such condition as packing ratio at the molding, the temperature of the mould, the reaction rate of the polyurethane foam forming, and so on. However, the thickness and the characteristics of the skin layer hardly change, when the polyurethane foam is molded under a conventional condition used in the seat cushion pad manufacturing that the packing ratio is 1.1 to 1.3, and the temperature of the mould is about 50 to 70° C. Ordinarily, the thickness of the skin layer of a conventionally used seat cushion pad, is about 10 mm. The density of the core portion is about 80 to 90%, in most case about 85%, of that of the total polyurethane foam density including the skin layer.

Examples of the method for controlling the air permeability by processing after molding of the seat cushion pad are: a flame treating of the surface of seating portion of a seat cushion pad having a conventional air permeability of larger than 2.0 cfm, so that cells are closed to the extent to lower the air permeability; an application of membrane forming synthetic resin solution or emulsion onto the surface of the seat cushion pad; and an application of film on the surface of the seat cushion pad. It is possible to apply such a membrane or a film on the surface of the mould as an insert material, before pouring the polyurethane foam raw material composition, to integrate such nmembrane or film with the seat cushion pad.

These method can be employed alone or together with a plurality of them.

In this way, a polyurethane cushion pad having a predetermined form can be obtained. It is possible to apply following materials onto the back of the seat cushion pad to form a supporter (reinforcement) integrated with the seat cushion pad: examples of such materials are, a pad supporter made from synthetic resin, such as, polyurethane, polypropylene, polyethylene, polystyrene, or foam of such materials, or materials such as, PP cloth, coarse blanket, non-woven fabric. Such supporter can be integrated by common method, for example, by one process method that applying such supporter on the mould and pouring raw material composition of polyurethane foam, to integrate directly onto the back surface of the seat cushion pad, or by adhesion using adhesives after molding the polyurethane foam, and so on.

Seat cushion pads, according to the present invention, will be covered with a covering material such as, leather, moquette, tricot, jersey or woven fabric, and fixings will be attached, before being assembled to an actual seat to be installed in a vehicle. It is preferable to attach one part of a surface fastener to the seat cushion pad by means of adhesive, and to fasten the covering material to the seat cushion pad by means of the surface fastener.

EMBODIMENTS

The features and effects of the present invention will be explained more precisely according to some examples of the present invention. The evaluation methods of the characteristics of the examples are as follows.

[Physical Properties of the Seat Cushion Pad]

a) 25% ILD (Indentation Load Deflection)

25% ILD is the load required for compressing the seat cushion pad by 25%, using a compressing plate having diameter of 200 mm (according to the regulation JIS K6400). When this ILD value is about 20 kgf, the seat will be agreeable to sit on.

b) Air Permeability (cfm)

Air permeability is measured according to the regulation ASTM D-1564. Namely, test pieces(length 50 mm, width 50 mm, thickness 25 mm) are sampled from three parts of the seat cushion pad at the seating portion under the hip point including skin layer, and the air permeability is measured using measuring device of FLUID DATA Co, (DOW method).

c) Hysteresis Loss (%)

Hysteresis loss is measured according to the regulation JIS K-6400. Samples, having a length of 100 mm, width of 100 mm and thickness of 30 mm, are obtained from the core portion (skin layer is removed). The thickness of the removed skin layer is about 10 mm.

d) Core Density (kg/m$^3$)

Core density is measured using samples obtained from the core portion of a seat cushion pad.

e) Feeling That Person's Body Bounds Up and Down (Hyoko Hyoko Feeling, or Feeling By Shaking), and Feeling of Oppression to Abdomen These characteristics are evaluated using seat cushions are actually installed in a vehicle, and five panelists drove the vehicle, and they estimated the feeling according to their feeling. The samples, having a thickness of 100 mm, does not correspond to a form of an actual seat. Thus, this feeling test using an actual vehicle is not executed for them.

[Vibration Transmissibility Characteristics of a Seat Cushion Pad]

Forced vibration test is evaluated according to the regulation JASO B-407, loading a Tekken type press plate of 50 kg and at a vibration amplitude of ±2.5 mm, so that a vibration transmissibility characteristics curve is obtained. And the resonance vibration (Hz), resonance amplitude, vibration transmissibilitys (at 6 Hz and 10 Hz) are measured. For the measurement of the vibration transmissibility characteristics, the seat cushion vibration tester C-1002DL (ITO SEIKI Co.), is used.

[Free Foaming Height]

Figure 3:
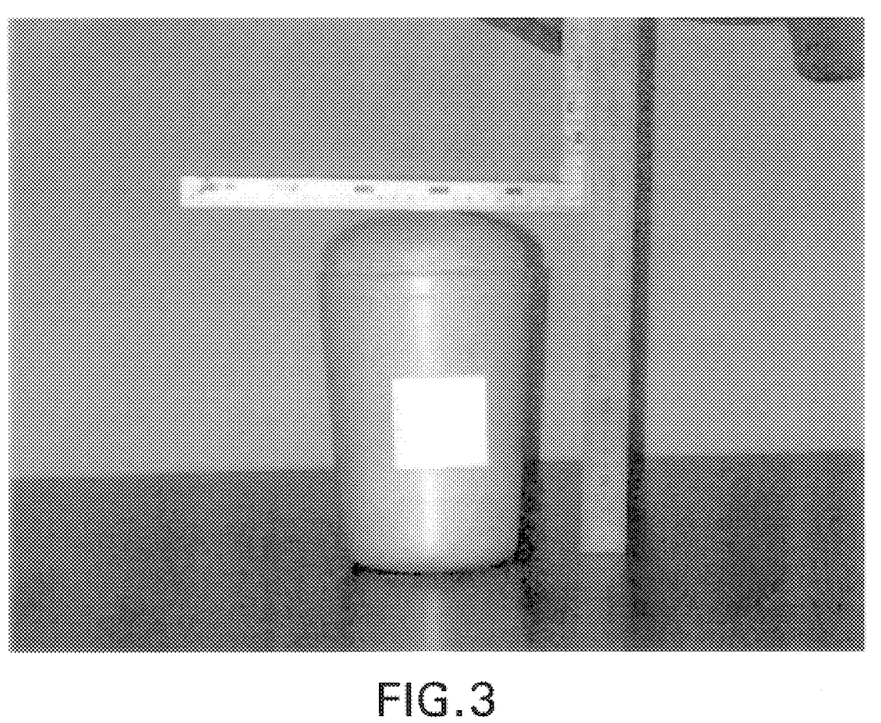
FIG. 3 is a side view showing how the free foaming height of foam is measured.

Each component listed in Table 1 are weighed to the total weight of the polyol composition to be about 600 g (isocyanate constituents are not included), which corresponds to about 5 times weight of polyol composition used in each foaming test (about 107 g), in a 1 L cylindrical vessel. The mixture is agitated for 5 minutes at 3500 rpm to prepare the polyol composition, using AUTOHOMO-MIXER AM-M (TOKUSHU KIKA KOGYO Co.) as mixer. The mixer has two stages of dispersion blade set, each set is comprised of six blades, (total number of the blades is 12), the blades have an edge height of 5 mm, the diameter of each set is 40 mm. The polyol composition is allowed to stand about 12 to 20 hours. Then a predetermined amount of the polyol composition is weighed into a foaming vessel. The foaming vessel is DESPOCUP 2 L, provided from IUCHI SEIEIDO Co., which is having frustum of cone form of the bottom diameter 105 mm, the top diameter 140 mm and the height 195 mm. Using the aforementioned mixer, AUTO-HOMOMIXER AM-M, the polyol composition is mixed five minutes at 3500 rpm in the foaming vessel, and immediately, isocyanate component is added in it so that NCO index is identical to be 1.0, (which corresponds to 100 in index expression). Further they are mixed 7 minutes at 3500 rpm so as to obtain a foaming composition. The foaming composition is allowed to stand, and foaming rection is carried out. The total weight of the forming composition is adjusted to be 147.3 g. Both of the polyol composition and the isocyanate component are used, after being adjusted to be 25° C. The free foaming height is measured as shown in FIG. 3. The foaming vessel containing the foam is set on a horizontal pedestal, and the height is measured using a metal scale. FIG. 3 shows how the free foaming height is measured. Table 2 shows the results of the measurement of the free foaming height (expressed in term of mm). The free foaming height measurement is executed 5 times for each of them. The maximum, minimum and mean values of the results are shown in Table 2. Table 3 shows the results of the measurement, when two kinds of surfactant are used.

TABLE 2

| Name of surfactant | Supplier | Maximum | Minimum | Mean |
|---|---|---|---|---|
| SF2965 | TORAY-DOWCORNING-SILICONE Co. | 240 | 226 | 234.6 |
| SF2962 | TORAY-DOWCORNING-SILICONE Co. | 244 | 233 | 238.0 |
| SF2961 | TORAY-DOWCORNING-SILICONE Co. | 242 | 232 | 234.8 |
| B8680 | T.H. GOLDSCHMIDT Co. | 242 | 226 | 235.4 |
| L5366 | NIHON UNICAR Co. | 242 | 233 | 238.4 |
| L5309 | NIHON UNICAR Co. | 223 | 240 | 232.8 |
| SRX274C | TORAY-DOWCORNING-SILICONE Co. | 222 | 205 | 212.4 |
| SF2969 | TORAY-DOWCORNING-SILICONE Co. | 225 | 205 | 217.2 |
| SF2964 | TORAY-DOWCORNING-SILICONE Co. | 224 | 206 | 216.0 |

TABLE 3

| Mixing proportion of surfactants | Mean free foaming height |
|---|---|
| SF2969/SF2904 = 0.95/0.05 | 240 mm |
| SF2969/SRX274C = 0.5/0.5 | 210 mm |
| SF2962/SF2964 = 0.5/0.5 | 229 mm |
| SF2962/SF2964 = 0.2/0.8 | 220 mm |
| SF2965/SF2964 = 0.5/0.5 | 230 mm |
| SF2965/SF2964 = 0.2/0.8 | 218 mm |
| B8680/SF2964 = 0.5/0.5 | 226 mm |
| B8680/SF2964 = 0.2/0.8 | 220 mm |

[Production of a Seat Cushion Pad]

The polyurethane foam raw material used in forming a seat cushion pad are listed in Table 4. The ratios x/y and m/n of the surfactant in Table 4 are values actually measured by means of NMR. The NMR data are measured by FT-NMR DPX400S (BURKER Co.). Sample surfactants were prepared as solutions of 2 parts by weight of chloroform. Ratios x/y and m/n are calculated as follows:

$x/y = [(P3 - 1.5 \times P5)/6]/(P5/2)$ $m/n = [(P1 - P2 - P5)/4]/(P2/3)$ where P1, P2, P3 and P5 are integral value of the following proton:

P1: H in —$OCH_2$—group and —OCH— group (3.0 to 4.0 ppm)
P2: H in C—$CH_3$ group (about 1.1 ppm)
P3: H in Si—$CH_3$ group (about 0 ppm)
P5: H in Si—$CH_2$— group (about 0.45 ppm)

TABLE 5

| Used materials | Composition number | | | | | | |
|---|---|---|---|---|---|---|---|
| | 1 | 2 | 3 | 4 | 5 | 6 | 7 |
| Polyol composition | | | | | | | |
| EP 901 | 70 | 70 | | | | | 70 |
| EP-3033 | | | 70 | 70 | 60 | 45 | |
| MN 1500 | | | | | 10 | 25 | |
| POP 3690 | 30 | 30 | 30 | 30 | 30 | 30 | 30 |
| Crosslinking agent KL-210 | 2.5 | 2.5 | 2.0 | 2.0 | 2.0 | 1.5 | 2.5 |
| Blowing agent Water | 2.5 | 2.5 | 2.5 | 2.5 | 2.5 | 2.5 | 2.5 |
| Surfactant SRX 274C | | | | 1.0 | | | 0.5 |
| Surfactant SF 2969 | 0.95 | | | | 0.95 | 0.95 | 0.5 |
| Surfactant SF 2904 | 0.05 | | | | 0.05 | 0.05 | |
| Surfactant SF 2962 | | 1.0 | 1.0 | | | | |
| Catalyst TEDA L-33 | 0.5 | 0.5 | 0.5 | 0.5 | 0.5 | 0.5 | 0.5 |
| Catalyst TOYOCAT-ET | 0.1 | 0.1 | 0.1 | 0.1 | 0.1 | 0.1 | 0.1 |
| Isocyanate component TM20 | (NCO index = 1.0) | | | | | | |

Three sorts of seat cushion pad are made, the thickness at the seating portion of each of them is 100 mm (Examples 1 to 3, Comparative Examples 1 to 4), 125 mm (Examples 4 to 6, Comparative Examples 5 to 8), 65 mm (Examples 7 to 9, Comparative Examples 9 to 12), respectively. The seat cushion pads, having the thickness of the seating portion of 125 and 65 mm, are made using a mould for a seat cushion pad for an actual vehicle. As to the seat cushion pad having the thickness of 65 mm, a supporting propylene net, NIS-

TABLE 4

| Name of material | Supplier | Details and characteristics |
|---|---|---|
| EP 901 | MITSUI CHEMICAL Co. | PPG, OHV = 24 mgKOH/g, unsaturated. terminal group conc. <0.1 meq/g |
| EP-3033 | MITSUI CHEMICAL Co. | PPG, OHV = 34 mgKOH/g |
| MN 1500 | MITSUI CHEMICAL Co. | PPG, OHV = 113 mgKOH/g |
| POP 3690 | MITSUI CHEMICAL Co. | Polymer polyol, OHV = 21 mgKOH/g |
| POP 3128 | MITSUI CHEMICAL Co. | Polymer polyol, OHV = 28 mgKOH/g |
| Crosslinking agent KL-210 | MITSUI CHEMICAL Co. | Main constituents: alkylene oxide added multi functional alcohol Hydroxyl value = 820 mgKOH/g |
| SF2965 | TORAY-DOW-CORNING-SILICONE Co. | Silicone surfactant (polydimethylsiloxane) |
| SF2962 | TORAY-DOW-CORNING-SILICONE Co. | Silicone surfactant (x = 0.77, y = 0.23, m = 0.19, n = 0.81) |
| B8680 | T. H. GOLDSCHMIDT Co. | Silicone surfactant (x = 0.85, y = 0.15, m = 0.06, n = 0.94) |
| SF2969 | TORAY-DOW-CORNING-SILICONE Co. | Silicone surfactant |
| SF2904 | TORAY-DOW-CORNING-SILICONE Co. | Silicone surfactant |
| SF2964 | TORAY-DOW-CORNING-SILICONE Co. | Silicone surfactant (x = 0.72, y = 0.28, m = 0.91, n = 0.09) |
| SRX274C | TORAY-DOW-CORNING-SILICONE Co. | Silicone surfactant (x = 0.76, y = 0.24, m = 0.91, n = 0.09) |
| TEDA L33 | TOSO Co. | Third class amine catalyst |
| TOYOCAT ET | TOSO Co. | Third class amine catalyst |
| TM 20 | MITSUI CHEMICAL Co. | Isocyanate mixture (TDI/c – MDI = 80/20) |

EXAMPLE AND COMPARATIVE EXAMPLES

The recipe for making the seat cushion pads of the examples and the comparative examples are listed in Table 5. The seat cushion pads are molded by foaming and polymerization of the raw material composition, which are weighed each component as listed in Table 5 and mixed homogeneously according to the conventional method, and poured into a mould.

SEKI CONWEDNET (NISSEKI GOJU SEIHIN Co.) is applied to the back side of the seat cushion pads. No supporting member is used for the seat cushion pad having the thickness of 125 mm. The seat cushion pad having the thickness of 100 mm are made, using a test mould which cavity is 400×400×100 (mm).

Figure 1:
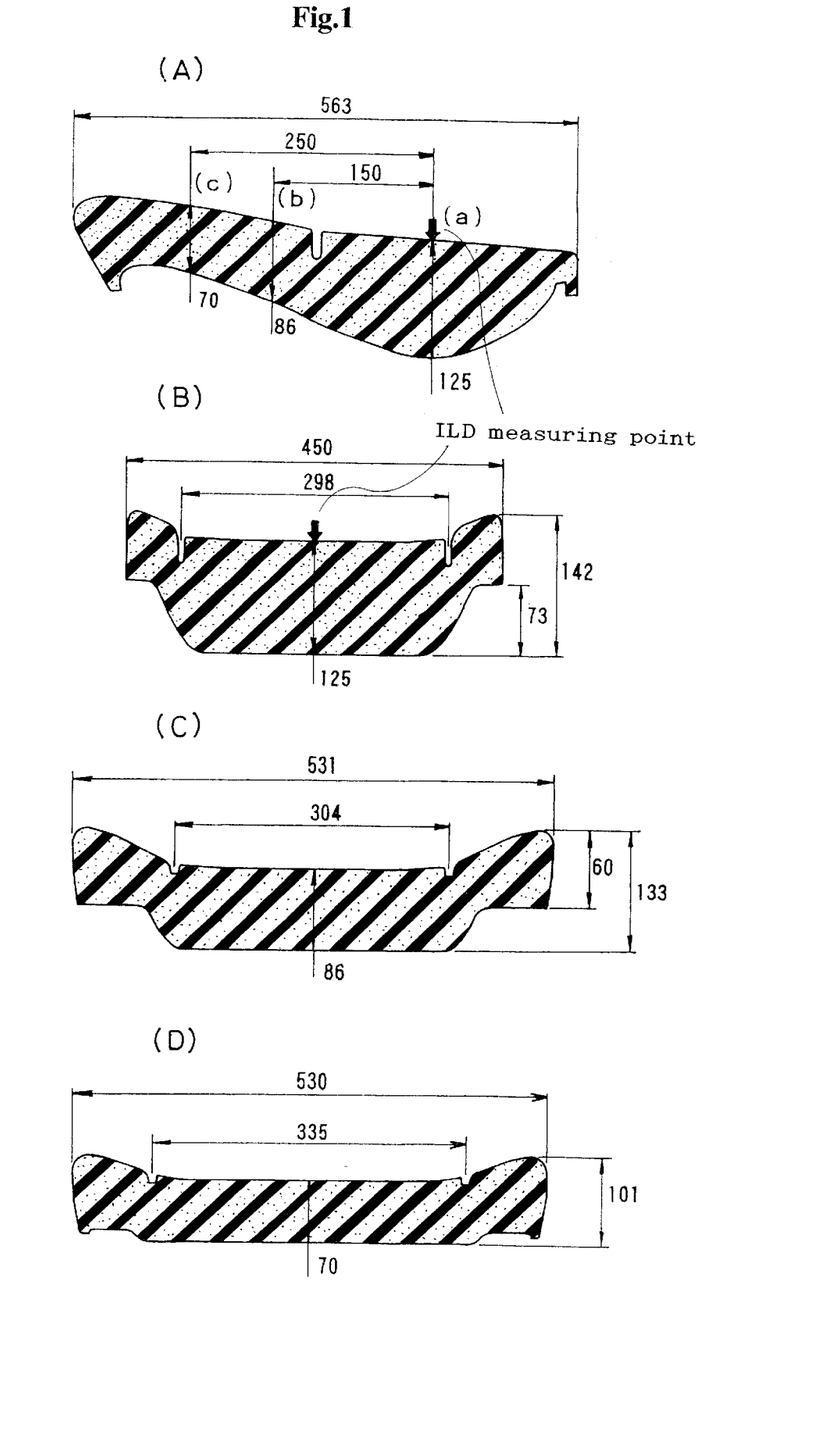
FIG. 1 is a cross sectional view of an example of a seat cushion having a thickness of seating portion of 125 mm.

The form of a seat cushion pad having a thickness of the seating portion of 125 mm is shown in FIG. 1. FIG. 1(A) is a longitudinal cross sectional view of the seat cushion pad, seen from the transverse direction of the vehicle. FIGS. 1(B) to ((D) are, respectively, transverse cross sectional views of the seat cushion pad at the positions (a), (b), (c) in FIG. 1(A). The position (a) is a seating portion, where the thickness is 125 mm.

Figure 2:
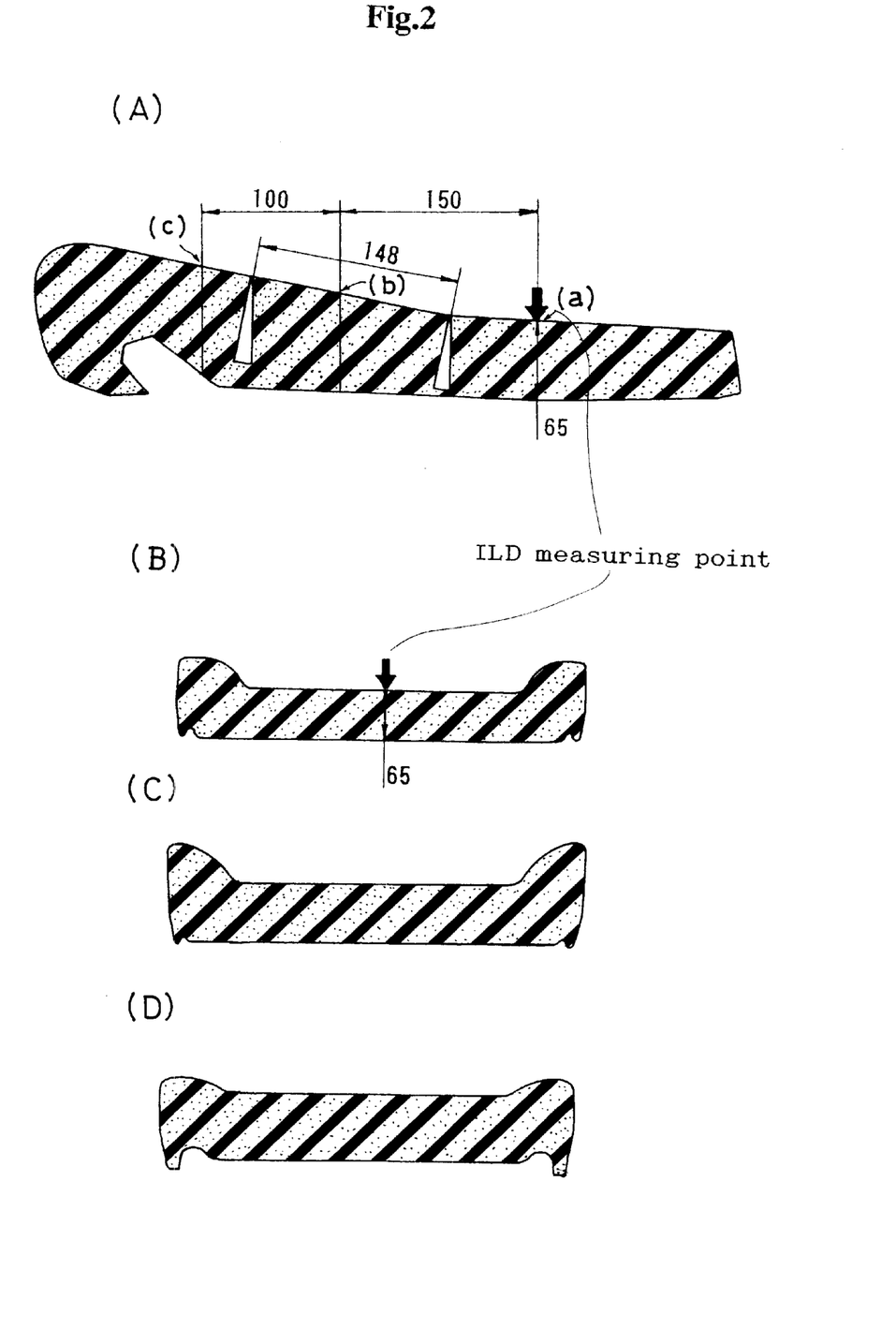
FIG. 2 is a cross sectional view of an example of a seat cushion having a thickness of seating portion of 65 mm.

The form of a seat cushion pad having a thickness of the seat surface of 65 mm is shown in FIG. 2. FIG. 2(A) is a longitudinal cross sectional view of the seat cushion pad, seen from the transverse direction of the vehicle. FIGS. 2(B) to ((D) are, respectively, transverse cross sectional views of the seat cushion pad at the positions (a), (b), (c) in FIG. 2(A). The position (a) is a seating portion, where the thickness is 65 mm.

ILD of the seat cushion pads, having a thickness of seat portion of 125 and 65 mm, is measured at the seating portions(a). The portions where the measurement is executed are marked in FIGS. 1 and 2. ILD of the seat cushion pad, having a thickness of seat portion of 100 mm, is measured at the center portion. The position below the hip point, where the air permeability is measured, is the region including this ILD measuring point.

Obtained physical properties of the seat cushion pad and the results of the measurement of the vibration transmissibility characteristics are shown in Table. 6 (thickness is 100 mm), Table. 7 thickness 125 mm) and Table. 8 (thickness 65 mm).

TABLE 6

|  |  | Example 1 | Example 2 | Example 3 | Comparative Example 1 | Comparative Example 2 | Comparative Example 3 | Comparative Example 4 |
|---|---|---|---|---|---|---|---|---|
|  | Thickness (mm) | 100 mm | | | | | | |
|  | Used Composition | 1 | 2 | 3 | 4 | 5 | 6 | 7 |
| Physical properties of pad | 25% ILD (kgf) | 20.2 | 19.9 | 20.8 | 20.3 | 21.1 | 21.1 | 19.5 |
|  | Air permeability (cfm) | 0.81 | 1.38 | 1.37 | 2.30 | 1.38 | 1.38 | 2.50 |
|  | Hysteresis loss | 14.8 | 14.9 | 16.7 | 16.3 | 17.5 | 20.1 | 14.3 |
|  | Density of core of foam (kg/m$^3$) | 55.3 | 55.2 | 55.9 | 55.4 | 55.7 | 56.1 | 54.9 |
| Vibration transmissibility characteristics | Resonance amplitude | 2.31 | 2.74 | 2.73 | 4.51 | 2.75 | 2.80 | 5.35 |
|  | Resonance frequency (HZ) | 3.20 | 3.10 | 3.40 | 3.32 | 3.51 | 3.98 | 3.10 |
|  | Vibration transmissibility 6 Hz | 0.55 | 0.48 | 0.59 | 0.59 | 0.65 | 0.86 | 0.51 |
|  | 10 Hz | 0.20 | 0.18 | 0.20 | 0.20 | 0.25 | 0.32 | 0.16 |

TABLE 7

|  |  | Example 4 | Example 5 | Example 6 | Comparative Example 5 | Comparative Example 6 | Comparative Example 7 | Comparative Example 8 |
|---|---|---|---|---|---|---|---|---|
|  | Thickness (mm) | 125 mm | | | | | | |
|  | Used Composition | 1 | 2 | 3 | 4 | 5 | 6 | 7 |
| Physical properties of pad | 25% ILD (kgf) | 20.9 | 21.4 | 20.5 | 21.2 | 21.9 | 21.3 | 22.1 |
|  | Air permeability (cfm) | 0.31 | 0.56 | 0.63 | 3.20 | 0.62 | 0.71 | 3.39 |
|  | Hysteresis loss | 14.3 | 14.4 | 16.3 | 15.9 | 17.1 | 19.7 | 14.1 |
|  | Density of core of foam (kg/m$^3$) | 52.7 | 53.1 | 51.9 | 52.3 | 53.5 | 53.7 | 52.8 |
| Vibration transmissibility characteristics | Resonance amplitude | 2.35 | 2.71 | 2.69 | 4.80 | 2.69 | 2.81 | 5.61 |
|  | Resonance frequency (HZ) | 3.15 | 3.17 | 3.38 | 3.34 | 3.47 | 3.78 | 3.02 |
|  | Vibration transmissibility 6 Hz | 0.48 | 0.42 | 0.49 | 0.49 | 0.61 | 0.78 | 0.29 |
|  | 10 Hz | 0.20 | 0.19 | 0.20 | 0.20 | 0.27 | 0.34 | 0.20 |
| Result of the panelists' estimation | Feeling that person's body bounds up and down at a low frequency | Yes | Yes | Yes | No | Yes | Yes | No |
|  | Feeling of oppression to abdomen | Yes | Yes | Yes | Yes | No | No | Yes |

TABLE 8

|  |  | Example 7 | Example 8 | Example 9 | Comparative Example 9 | Comparative Example 10 | Comparative Example 11 | Comparative Example 12 |
|---|---|---|---|---|---|---|---|---|
|  | Thickness (mm) | 65 mm | | | | | | |
|  | Used Composition | 1 | 2 | 3 | 4 | 5 | 6 | 7 |
| Physical properties of pad | 25% ILD (kgf) | 20.6 | 20.1 | 0.7 | 19.9 | 19.4 | 20.2 | 19.8 |
|  | Air permeability (cfm) | 0.90 | 1.32 | 1.41 | 2.10 | 1.43 | 1.33 | 2.60 |
|  | Hysteresis loss | 14.5 | 14.6 | 16.8 | 16.4 | 17.7 | 20.2 | 14.5 |
|  | Density of core of foam (kg/m$^3$) | 56.4 | 56.8 | 55.5 | 55.9 | 57.1 | 56.8 | 56.1 |
| Vibration transmissibility characteristics | Resonance amplitude | 2.01 | 2.44 | 2.51 | 3.85 | 2.34 | 2.41 | 3.95 |
|  | Resonance frequency (HZ) | 3.38 | 3.41 | 3.51 | 3.50 | 3.71 | 4.11 | 3.30 |
|  | Vibration transmissibility 6 Hz | 0.95 | 0.91 | 0.99 | 0.99 | 1.03 | 1.10 | 0.91 |
|  | 10 Hz | 0.37 | 0.34 | 0.38 | 0.38 | 0.41 | 0.45 | 0.35 |
| Result of the panelists' estimation | Feeling that person's body bounds up and | Yes | Yes | Yes | No | Yes | Yes | No |

TABLE 8-continued

|  | Example 7 | Example 8 | Example 9 | Comparative Example 9 | Comparative Example 10 | Comparative Example 11 | Comparative Example 12 |
|---|---|---|---|---|---|---|---|
| down at a low frequency Feeling of oppression to abdomen | Yes | Yes | Yes | Yes | No | No | Yes |

As shown in Tables 6 to 8, the seat cushion pad according to the present invention has a air permeability and hysteresis loss which are within a desired range. Therefore, when the level of the resonance amplitude is equal to that of a conventional seat cushion pad, the vibration transmissibility characteristics at 6 Hz can be made lower than that of the conventional seat cushion pad. As a result, the seat cushion made from such a seat cushion pad can satisfy both of the requirements to suppress the feelings that person's body bounds up and down (feeling by shaking) at a low frequency and that the oppression of abdomen.

On the other hand, the seat cushion pads 1 and 4 of in comparative examples shown in Table 6, the seat cushion pads 5 and 8 in the comparative examples shown in Table 7, and the seat cushion pads 9 and 12 in the comparative examples shown in Table 8, have a air permeability higher than 1.5 cfm. Therefore the resonance amplitude is large.

The hysteresis losses of the core layer of Examples 2 and 3 in Table 6, Examples 6 and 7 in Table 7, and Examples 10 and 11 on Table 8 are over 17%. Therefore, the resonance frequency is higher. And also the vibration transmissibility at about 6 Hz is large compared to the seat cushion pads of the present invention of an identical thickness at the seating portion. As a result, the seat cushion made from such a seat cushion pad of comparative examples can satisfy neither of the requirements to suppress the feelings that person's body bounds up and down at a low frequency nor that the oppression of abdomen.

EXAMPLES 10 TO 27, COMPARATIVE EXAMPLES 13 TO 22

The recipe for making the seat cushion pads of the examples and the comparative examples are listed in Tables 9 and 10.

TABLE 9

| | Composition number | | | | | | | | | | | |
|---|---|---|---|---|---|---|---|---|---|---|---|---|
| Used materials | 8 | 9 | 10 | 11 | 12 | 13 | 14 | 15 | 16 | 17 | 18 | 19 |
| Polyol | | | | | | | | | | | | |
| EP 901 | 60 | 60 | 60 | 60 | 60 | 60 | 60 | 60 | 60 | 60 | 60 | 60 |
| MN 1500 | | | | | | | | | | | | |
| POP3690 | 40 | 40 | 40 | 40 | 40 | 40 | 40 | 40 | 40 | 40 | 40 | 40 |
| POP3128 | | | | | | | | | | | | |
| Crosslinking agent | 2.5 | 2.5 | 2.5 | 2.5 | 2.5 | 2.5 | 2.5 | | 2.5 | 2.5 | 2.5 | 2.5 |
| Blowing agent Water | 2.5 | 2.5 | 2.5 | 2.5 | 2.5 | 2.5 | 2.5 | 2.5 | 2.5 | 2.5 | 2.5 | 2.5 |
| Surfactant | | | | | | | | | | | | |
| SF2965 | | | | | 1.0 | 0.8 | 0.5 | 0.2 | | | | |
| SF2962 | 1.0 | 0.8 | 0.5 | 0.2 | | | | | | | | |
| B8680 | | | | | | | | | 1.0 | 0.8 | 0.5 | 0.2 |
| SF2964 | | 0.2 | 0.5 | 0.8 | | 0.2 | 0.5 | 0.8 | | 0.2 | 0.5 | 0.8 |
| Catalyst | | | | | | | | | | | | |
| TEDA L-33 | 0.5 | 0.5 | 0.5 | 0.5 | 0.5 | 0.5 | 0.5 | 0.5 | 0.5 | 0.5 | 0.5 | 0.5 |
| TOYOCAT-ET | 0.1 | 0.1 | 0.1 | 0.1 | 0.1 | 0.1 | 0.1 | 0.1 | 0.1 | 0.1 | 0.1 | 0.1 |
| NCO constituents | (NCO index = 1.0) | | | | | | | | | | | |
| TM-20 | | | | | | | | | | | | |

TABLE 10

| | Dosage number | | | | | | | | | | | | | | | |
|---|---|---|---|---|---|---|---|---|---|---|---|---|---|---|---|---|
| Used materials | 20 | 21 | 22 | 23 | 24 | 25 | 26 | 27 | 28 | 29 | 30 | 31 | 32 | 33 | 34 | 35 |
| Polyol | | | | | | | | | | | | | | | | |
| EP 901 | 60 | 60 | 60 | 60 | 60 | 60 | 60 | 60 | 60 | 60 | 60 | 60 | 45 | 45 | 30 | 30 |
| MN-1500 | | | | | | | | | | | | | 15 | 15 | 30 | 30 |
| POP3690 | | | | | | | | | | | | | 40 | 40 | 40 | 40 |
| POP3128 | 40 | 40 | 40 | 40 | 40 | 40 | 40 | 40 | 40 | 40 | 40 | 40 | | | | |
| Crosslinking agent | 2.0 | 2.0 | 2.0 | 2.0 | 2.0 | 2.0 | 2.0 | 2.0 | 2.0 | 2.0 | 2.0 | 2.0 | 1.5 | 1.5 | 1.0 | 1.0 |
| Blowing agent Water | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| Surfactant | | | | | | | | | | | | | | | | |

TABLE 10-continued

| | Dosage number | | | | | | | | | | | | | | | |
|---|---|---|---|---|---|---|---|---|---|---|---|---|---|---|---|---|
| Used materials | 20 | 21 | 22 | 23 | 24 | 25 | 26 | 27 | 28 | 29 | 30 | 31 | 32 | 33 | 34 | 35 |
| SF2965 | | | | | 1.0 | 0.8 | 0.5 | 0.2 | | | | | | | | |
| SF2962 | 1.0 | 0.8 | 0.5 | 0.2 | | | | | | | | | 1.0 | | 1.0 | |
| B8680 | | | | | | | | | 1.0 | 0.8 | 0.5 | 0.2 | | | | |
| SF2964 | | 0.2 | 0.5 | 0.8 | | 0.2 | 0.5 | 0.8 | | 0.2 | 0.5 | 0.8 | | 1.0 | | 1.0 |
| Catalyst | | | | | | | | | | | | | | | | |
| TEDA L-33 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| TOYOCAT-ET | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| NCO constituents TM-20 | | | | | | | | | (NCO index = 1.0) | | | | | | | |

The seat cushion pad is made, using a mould for making a seat cushion pad having a thickness of the seating portion of 125 mm, which is shown in FIG. 1. The method for making the seat cushion pad is identical to that of Examples 4 to 6. The physical properties and the vibration transmissibility of the obtained seat cushion pad are measured, in the same manner as Examples 4 to 6. And the panelists estimated the characteristics on the feeling that person's body bounds up and down at a low frequency and that the oppression of abdomen. The result of the estimation is shown in Tables 11 and 12.

TABLE 11

| | | Examples | | | | | | | | | Comparative Examples | | |
|---|---|---|---|---|---|---|---|---|---|---|---|---|---|
| | | 10 | 11 | 12 | 13 | 14 | 15 | 16 | 17 | 18 | 13 | 14 | 15 |
| Used composition number | | 8 | 9 | 10 | 12 | 13 | 14 | 16 | 17 | 18 | 11 | 15 | 19 |
| Physical properties of pad | 25% ILD (kgf) | 20.2 | 19.9 | 19.5 | 20.9 | 20.8 | 20.3 | 20.3 | 20.4 | 20.3 | 20.1 | 20.8 | 20.9 |
| | Air permeability (cfm) | 0.81 | 1.01 | 1.38 | 0.60 | 0.80 | 1.20 | 0.58 | 0.79 | 1.22 | 2.90 | 2.50 | 3.10 |
| | Hysteresis loss (%) | 14.8 | 14.7 | 14.9 | 14.6 | 14.9 | 14.7 | 14.5 | 14.8 | 14.2 | 14.5 | 14.2 | 14.1 |
| | Density of core (kg/m$^3$) | 55.3 | 55.2 | 55.4 | 54.8 | 55.9 | 55.7 | 55.1 | 55.9 | 55.3 | 55.2 | 55.8 | 55.7 |
| Vibration transmissibility characteristics | Resonance amplitude | 2.31 | 2.60 | 2.74 | 2.30 | 2.38 | 2.73 | 2.25 | 2.42 | 2.79 | 5.38 | 5.10 | 5.40 |
| | Resonance frequency (HZ) | 3.20 | 3.12 | 3.10 | 3.14 | 3.21 | 3.20 | 3.17 | 3.17 | 3.15 | 3.09 | 3.12 | 3.13 |
| | Vibration transmissibility 6 Hz | 0.55 | 0.50 | 0.49 | 0.56 | 0.55 | 0.51 | 0.57 | 0.55 | 0.50 | 0.51 | 0.51 | 0.50 |
| | 10 Hz | 0.20 | 0.19 | 0.18 | 0.20 | 0.20 | 0.20 | 0.20 | 0.19 | 0.20 | 0.16 | 0.17 | 0.16 |
| Result of the panelists' estimation | Feeling that person's body bounds up and down at a low frequency | Yes | Yes | Yes | Yes | Yes | Yes | Yes | Yes | Yes | No | No | No |
| | Feeling of oppression to abdomen | Yes | Yes | Yes | Yes | Yes | Yes | Yes | Yes | Yes | Yes | Yes | Yes |

TABLE 12

| | | Examples | | | | | | | | | Comparative Examples | | | | | | |
|---|---|---|---|---|---|---|---|---|---|---|---|---|---|---|---|---|---|
| | | 19 | 20 | 21 | 22 | 23 | 24 | 25 | 26 | 27 | 16 | 17 | 18 | 19 | 20 | 21 | 22 |
| Used composition number | | 20 | 21 | 22 | 24 | 25 | 26 | 28 | 29 | 30 | 23 | 27 | 31 | 32 | 33 | 34 | 35 |
| Physical properties of pad | 25% ILD (kgf) | 20.1 | 19.7 | 20.3 | 20.5 | 19.3 | 19.8 | 20.9 | 20.5 | 20.3 | 20.3 | 20.5 | 19.9 | 19.7 | 20.1 | 20.5 | 20.3 |
| | Air permeability (cfm) | 0.85 | 1.10 | 1.42 | 0.71 | 0.75 | 1.32 | 0.73 | 0.77 | 1.35 | 2.85 | 2.67 | 2.72 | 0.85 | 2.32 | 0.79 | 2.41 |
| | Hysteresis loss (%) | 16.8 | 16.5 | 16.3 | 16.7 | 16.5 | 16.2 | 16.5 | 16.4 | 16.4 | 16.2 | 16.3 | 16.2 | 17.9 | 17.5 | 20.2 | 20.1 |
| | Density of core (kg/m$^3$) | 55.3 | 55.5 | 55.7 | 54.4 | 55.1 | 54.7 | 54.6 | 54.9 | 54.3 | 54.9 | 55.2 | 54.7 | 55.1 | 54.7 | 54.3 | 55.5 |
| Vibration transmissibility characteristics | Resonance amplitude | 2.34 | 2.73 | 2.78 | 2.41 | 2.52 | 2.81 | 2.47 | 2.60 | 2.85 | 5.01 | 4.92 | 4.83 | 2.35 | 4.71 | 2.41 | 4.10 |
| | Resonance frequency (HZ) | 3.30 | 3.30 | 3.20 | 3.31 | 3.36 | 3.28 | 3.30 | 3.39 | 3.32 | 3.21 | 3.25 | 3.21 | 3.51 | 3.45 | 3.68 | 3.64 |
| | Vibration transmissibility 6 Hz | 0.59 | 0.59 | 0.58 | 0.59 | 0.59 | 0.59 | 0.59 | 0.59 | 0.58 | 0.59 | 0.59 | 0.59 | 0.65 | 0.64 | 0.77 | 0.76 |
| | 10 Hz | 0.20 | 0.20 | 0.20 | 0.20 | 0.20 | 0.20 | 0.20 | 0.20 | 0.20 | 0.20 | 0.20 | 0.20 | 0.22 | 0.22 | 0.24 | 0.23 |
| Result of the panelists' estimation | Feeling that person's body bounds up and down at a low frequency | Yes | Yes | Yes | Yes | Yes | Yes | Yes | Yes | Yes | No | No | No | Yes | No | Yes | No |
| | Feeling of oppression to abdomen | Yes | Yes | Yes | Yes | Yes | Yes | Yes | Yes | Yes | Yes | Yes | Yes | No | No | No | No |

Also in these results, it is shown that both of the resonance amplitude and the vibration transmissibility at 6 Hz are low, when the air permeability and hysteresis loss of the core layer of the seat cushion pad are sufficiently low to satisfy the requirements of the present invention. This result is identical to the cases of Examples 1 to 9 and Comparative Examples 1 to 12. And the satisfying result can be obtained on the feeling that person's body bounds up and down at a low frequency and that the oppressive feeling of abdomen, compared to the conventional seat cushion pad.

According to the present invention, on one hand, the resonance amplitude at 2 to 4 Hz can be decreased, and on the other hand, the vibration transmissibility at about 6 Hz can be decreased to identical or lower than that of conventional one. Thus, a seat cushion pad having a high vibration attenuation characteristics can be provided. And the feeling that person's body bounds up and down at a low frequency and that the oppressive feeling of abdomen can be avoided.

What is claimed is:

1. A seat cushion pad composed of polyurethane foam having a skin layer and a core layer, molded by supplying a polyurethane foam raw material composition into a mold,
   the seat cushion pad comprising a seating surface having a single-layer structure, air permeability of the molded polyurethane foam being between 0.05 and 1.5 cfm, and hysteresis loss of the core layer being no greater than 17%.

2. A seat cushion pad according to claim 1,
   wherein the polyurethane foam raw material composition comprises:
   a) 30 to 80 parts by weight of polyetherpolyol having hydroxyl value of 20 to 40 mgKOH/g and a terminal ethylene oxide unit;
   b) 70 to 20 parts by weight of polymer polyol, having hydroxyl value of 15 to 30 mgKOH/g;
   c) 0.1 to 2 parts by weight of silicone surfactant;
   d) blowing agents; and
   e) polyisocyanate compounds, where TDI/MDI=70/30 to 90/10.

3. A seat cushion pad according to claim 1, wherein density of the core layer of the molded polyurethane foam is 50–65 kg/m$^3$.

4. A seat cushion pad according to any one of claims 1 to 3, wherein the air permeability of the molded polyurethane foam is between 0.1 and 1.5 cfm, and the hysteresis loss of the core layer is no greater than 15%.

5. A seat cushion pad composed of polyurethane foam having a skin layer and a core layer, molded by supplying a polyurethane foam raw material composition into a mold and of which the seating surface has a single-layer structure,
   wherein the polyurethane foam raw material composition comprises:
   a) 30 to 80 parts by weight of polyether polyol having hydroxyl value of 20 to 40 mgKOH/g and a terminal ethylene oxide unit;
   b) 70 to 20 parts by weight of polymer polyol, having hydroxyl value of 15 to 30 mgKOH/g;
   c) 0.1 to 2 parts by weight of silicone surfactant;
   d) blowing agents; and
   e) polyisocyanate compounds,
   and the silicone surfactant is selected so that free foaming height will be at least 225 mm.

6. A seat cushion pad according to claim 5, wherein the polyurethane foam raw material composition contains a low molecular crosslinking agent having a hydroxyl value of 300–2000 mgKOH/g.

7. A seat cushion pad according to claim 5, wherein the polyurethane foam raw material composition uses mixed compounds of TDI:MDI=70:30: to 90:10 by weight as the polyisocyanate compounds.

8. A seat cushion pad according to any one of claims 5 to 7, wherein air permeability of the molded polyurethane foam is between 0.05 and 1.5 cfm and hysteresis loss of the core layer is no greater than 17%.

* * * * *